July 29, 1924.
J. P. WALSH
NONSKID ATTACHMENT FOR VEHICLE WHEELS
Filed June 13, 1922
1,503,079
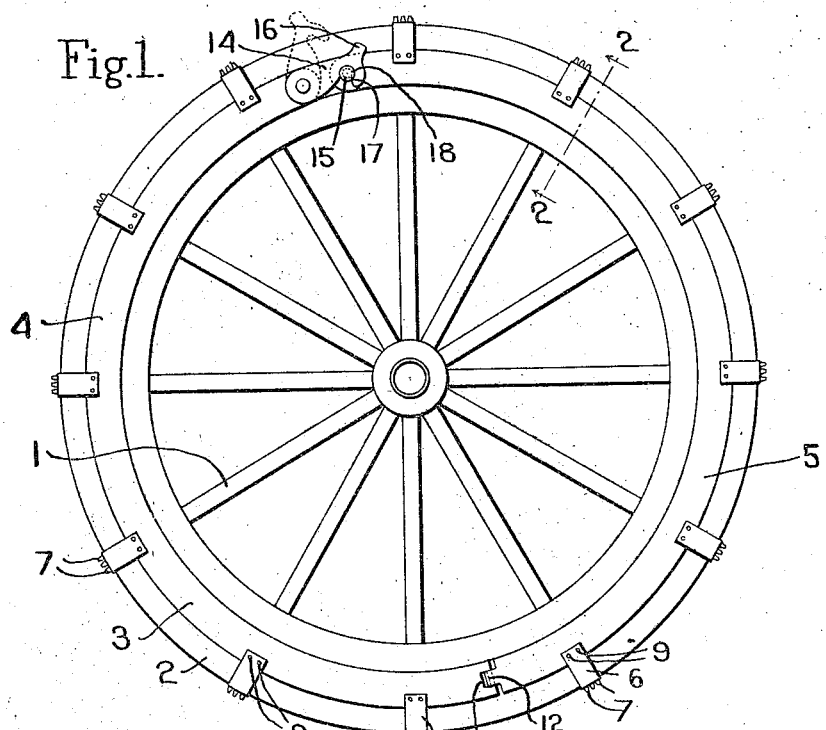
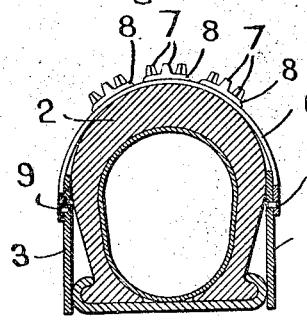
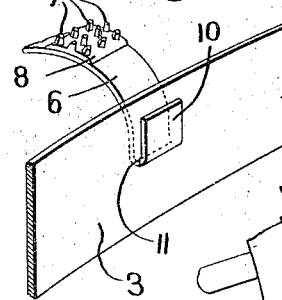
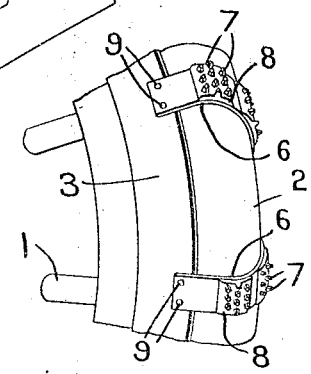
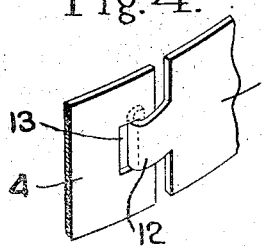
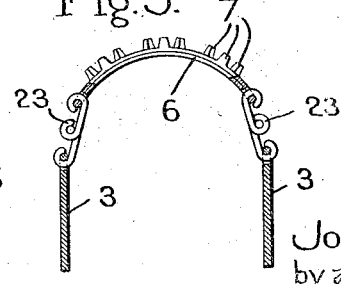
Inventor.
John P. Walsh
by Heard Smith & Tennant
Attys Patented July 29, 1924.

1,503,079

UNITED STATES PATENT OFFICE.

JOHN P. WALSH, OF CAMBRIDGE, MASSACHUSETTS, ASSIGNOR TO HENRY J. WALSH, OF SYRACUSE, NEW YORK.

NONSKID ATTACHMENT FOR VEHICLE WHEELS.

Application filed June 13, 1922. Serial No. 567,960.

*To all whom it may concern:*

Be it known that I, JOHN P. WALSH, a citizen of the United States, and resident of Cambridge, county of Middlesex, State of Massachusetts, have invented an Improvement in Nonskid Attachments for Vehicle Wheels, of which the following description, in connection with the accompanying drawing, is a specification, like characters on the drawing representing like parts.

This invention relates to a non-skid attachment for vehicle wheels which is constructed so that it can be easily applied to any vehicle wheel, and when so applied will prevent the wheel from skidding or spinning and will give the wheel the proper traction when travelling over or through sand, mud, snow or similar soft material.

The features wherein my invention resides will be more fully hereinafter set forth and then pointed out in the claims.

In the drawings wherein I have illustrated some selected embodiment of my invention:

Fig. 1 is a side view of a vehicle wheel having my improvements applied thereto.

Fig. 2 is a section on the line 2—2, Fig. 1.

Fig. 3 is a perspective view showing a different form of the invention.

Fig. 4 is a fragmentary perspective view showing the connection between the members 4 and 5.

Fig. 5 is a sectional view showing a different embodiment of the invention.

Fig. 6 is a perspective view of a portion of a wheel having my improvements applied thereto.

My improved non-skid attachment comprises two annular members or plates adapted to overlie the sides of a vehicle tire, each member being formed of separable sections which are detachably connected together, and non-skid elements connecting the annular members and embracing the tread of the tire, said non-skid elements being in the form of flexible straps which have non-skid or traction projections secured to the annular members.

In the drawings 1 indicates a vehicle wheel and 2 the tire thereof. The two annular members which overlie the sides of the tire are indicated at 3 and each one is made in separable sections. In the drawings I have illustrated each annular member as made in two sections 4 and 5 but I wish to state that the number of the sections in each annular member is immaterial and said members may be made in three, four or any number of sections desired.

The non-skid elements are indicated at 6 and each is in the form of a flexible strap which overlies the tire and is secured at its end to the annular members 3. Each of these non-skid elements 6 has a plurality of projections 7 extending therefrom. These projections are preferably made on blocks 8 of metal which are riveted or otherwise rigidly secured to the straps 6 and each strap may have a greater or less number of these blocks 8 secured thereto depending upon the size of the tire.

The non-skid elements 6 may be secured to the annular members 3 either by welding them thereto or by means of rivets as shown at 9 or by making the ends of the non-skid elements with hooks 10 adapted to hook into apertures 11 formed in the members 3 as shown in Fig. 3. The central portion of the non-skid element is relatively inflexible and is practically rigid but the end portions of the non-skid element that are attached to the annular members 3 are quite flexible. In the case of the construction shown in Figs. 2 and 3 this flexibility is secured by making the end portions of the part 6 of a flexible material. In Fig. 5 the flexibility is provided by making these end portions in the form of sections which are hinged together as shown at 23. This sectional, or articulated, structure makes a flexible portion which allows the non-skid element to have the necessary yielding movement as the wheel passes over inequalities in the road surface. Where the articulated structure of Fig. 5 is employed the end section is formed with the hook which hooks into the member 3.

The sections 4 and 5 of the elements 3 are detachably secured together to permit the device to be attached to or removed from the tire and while any suitable means for thus detachably connecting them may be employed I regard the construction shown as simple and practicable.

One end of each member 5 is provided with a hook 12 adapted to hook into an aperture 13 on the meeting end of the section 4. The other end of the section 4 has a hook 14 pivoted thereto which is adapted to engage a pin or projection 15 carried by the member 5. This hook 14 is formed with an extension 16 to which force may be applied in bringing the hook into engagement with or disengaging it from the projection 15. In applying the attachment to the tire the hooks 12 may be hooked into the apertures 13 and then the two parts of the device may be placed around the tire, after which the pivoted hook 14 can be swung into locking engagement with the pin 15. The hook 14 is formed with the swell 17 and with the recess 18 behind the swell. The purpose of this construction is to prevent the hook from becoming disengaged from the pin 15. In swinging the hook into operative position the swell 17 has to be crowded past the pin 15 and as soon as the pin 15 enters the recess 18 it will be retained therein and considerable force may be necessary to disengage it. The extension 16 provides means by which this necessary force can be applied to the hook either by means of pressure or by means of hammer blows.

The non-skid elements 6 are very flexible and therefore they will readily yield or give to conform to inaccuracies in the road surface and also to conform to the shape of the tire.

The blocks 8 and traction projections 7 form a traction tread surface for the tire which will not only prevent it from skidding but which will also prevent the tire from unduly spinning or slipping when travelling over sand, soft dirt, mud, snow, etc., and my invention, therefore, provides a non-skid attachment which is adaptable for all uses and which is extremely efficient.

When the non-skid attachment is removed from the wheel one section can be nested into the other section so that the device can be packed away in a comparatively small space.

The non-skid elements 6 may be made of metal, rubber, fiber, leather or any other suitable material.

I claim:—

1. In a non-skid attachment for vehicle wheels, the combination with two annular radially-inflexible members adapted to overlie the sides of a vehicle tire, of non-skid elements overlying the tread of the tire and connected to the annular members, the central portions of said non-skid elements being relatively inflexible and the end portions that are secured to the annular members being made of sections hinged together to provide for the necessary yielding movement as the wheel passes over inequalities in the road.

2. In a non-skid attachment for vehicle wheels, the combination with two annular radially-inflexible members adapted to overlie the sides of a vehicle tire, each member having a plurality of apertures and being made in separable sections detachably secured together, of non-skid elements overlying the tread of the tire and having their ends formed into hook shape which are hooked into the apertures of the annular members, the central portion of each non-skid element being relatively inflexible and the end portions that are hooked to the annular members being formed of sections hinged together.

In testimony whereof, I have signed my name to this specification.

JOHN P. WALSH.